March 5, 1946.  T. EFSTATHIOU  2,396,092
PARACHUTE
Filed Jan. 6, 1944  3 Sheets-Sheet 2

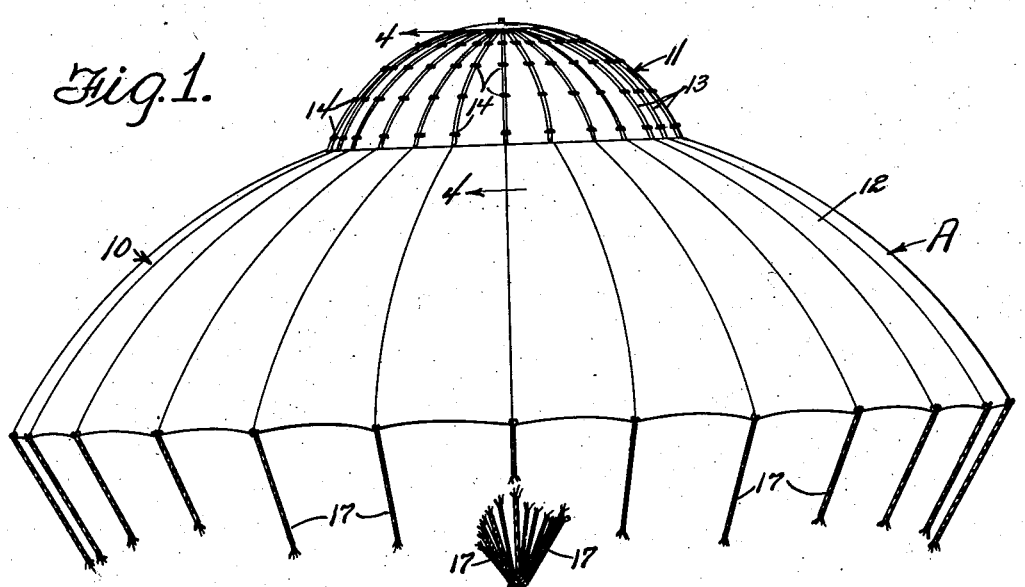
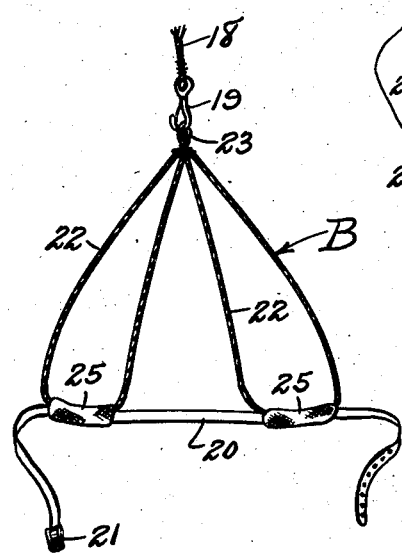
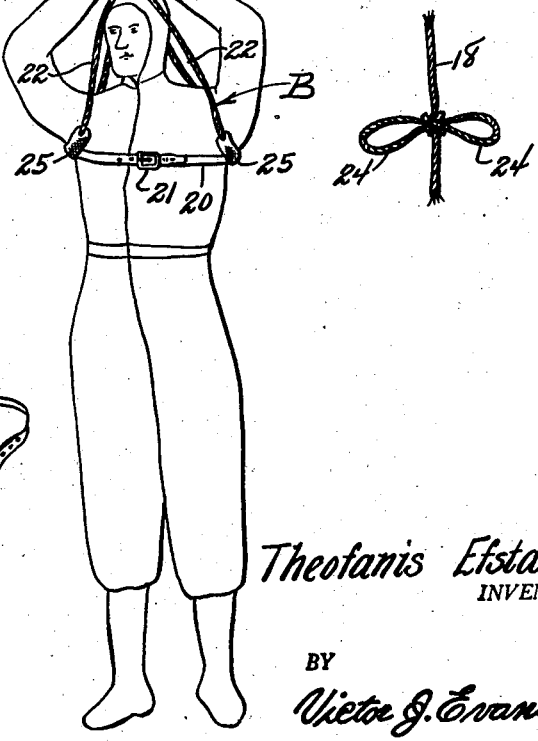

Theofanis Efstathiou INVENTOR.

BY
Victor J. Evans
ATTORNEY

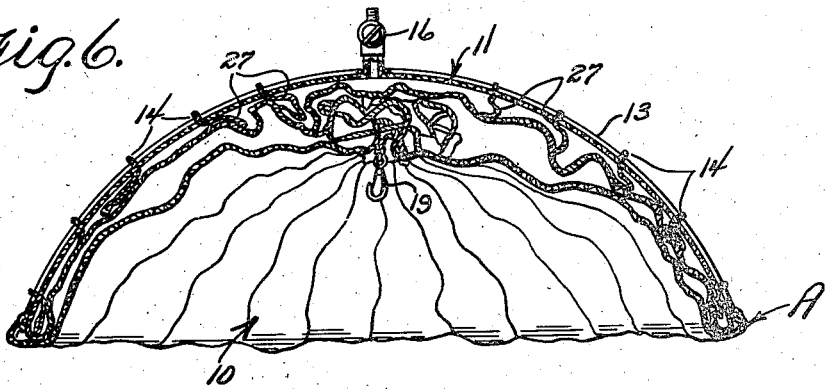
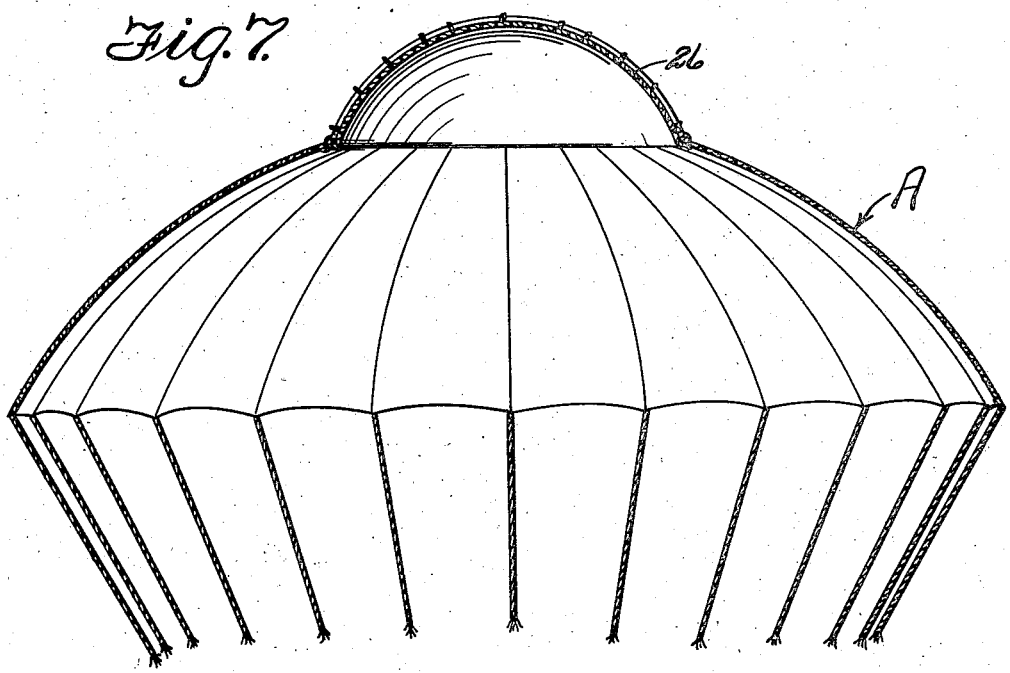

Patented Mar. 5, 1946

2,396,092

UNITED STATES PATENT OFFICE 2,396,092

PARACHUTE

Theofanis Efstathiou, Bronx, N. Y.

Application January 6, 1944, Serial No. 517,245

1 Claim. (Cl. 244—142)

The invention relates to a parachute, and more especially to a plumb body-harness-equipped partially extensible and collapsible parachute.

The primary object of the invention is the provision of a parachute of this character, wherein the kite, sail or gliding unit thereof is permanently partially extended and partially collapsible, the permanent extended area being materially reinforced to maintain its extended condition, and affords a pocket or cavity for the placement of the collapsible area therein when the parachute is not in use, in that the permanently extended area is of dome formation, while the unit in its entirety when extended is of umbrella shape, for maximum safety in parachuting operation.

Another object of the invention is the provision of a parachute of this character, wherein the permanently extended area may be rendered buoyant by creating an inflatable compartment or chamber thereto, the parachute being fitted with a plumb body-harness which enables the parachuter to land in a standing position, in that such parachuter is perpendicularly suspended at all times during parachuting.

A further object of the invention is the provision of a parachute of this character, wherein the kite, sail or gliding unit is of novel construction, and likewise the harness is unique and novel in entirety, so that when such parachute is in service it assures a greater degree of safety to the user while in flight, parachuting and landing.

A still further object of the invention is the provision of a parachute of this character, wherein the harness will assist in holding the same equally balanced on the opening thereof, in order that the parachuter will have a better chance of landing on the feet, the parachute being self-contained, weather-proofed and light in weight.

A still further object of the invention is the provision of a parachute of this character, wherein the permanent dome formation thereto assures quick self-opening of the same, in that the collapsed area will be instantly withdrawn from such dome immediately on the jump or take off of the parachuter for gradual flight descent of the latter.

A still further object of the invention is the provision of a parachute of this character, wherein the center of the kite, sail or glider unit is of a permanent inverted cup formation affording a storage space for the tucking of the remainder of such unit, which remainder is freely flexible, into such space, thereby bringing the unit into compact form, so that it can be conveniently handled for service, as well as occupying the least possible area when not in use.

A still further object of the invention is the provision of a parachute of this character, which is simple in construction, thoroughly reliable and efficient in operation, readily and easily handled, assuring a maximum degree of safety to a user, strong, durable, susceptible of quick application and removal, and inexpensive to manufacture.

With these and other objects in view, the invention consists in the features of construction, combination and arrangement of parts as will be hereinafter more fully described, illustrated in the accompanying drawings, which show the preferred and modified forms of construction of the invention, and pointed out in the claim hereunto appended.

In the accompanying drawings:

Figure 1 is an elevation of the parachute constructed in accordance with the invention and in an applied flight position.

Figure 2 is a perspective view of the body harness of the parachute, and detached from the person.

Figure 3 is a fragmentary elevation of the hand hold loops of the suspension line of the parachute.

Figure 6 is a sectional view taken on the line 6—6 of Figure 5 looking in the direction of the arrows.

Figure 7 is a view similar to Figure 1 showing a modification of the kite, sail or glider unit of the parachute.

Similar reference characters indicate corresponding parts throughout the several views in the drawings.

Figure 4:
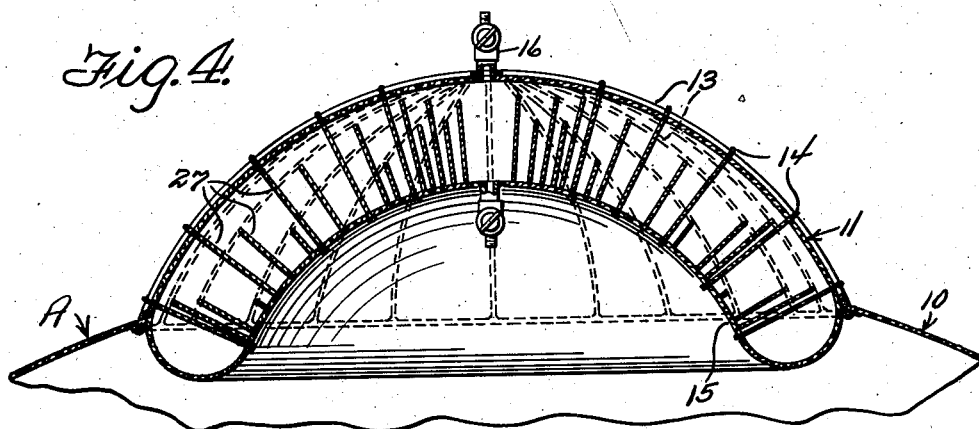
Figure 4 is a fragmentary sectional view taken on the line 4—4 of Figure 1 looking in the direction of the arrows.
Figure 5:
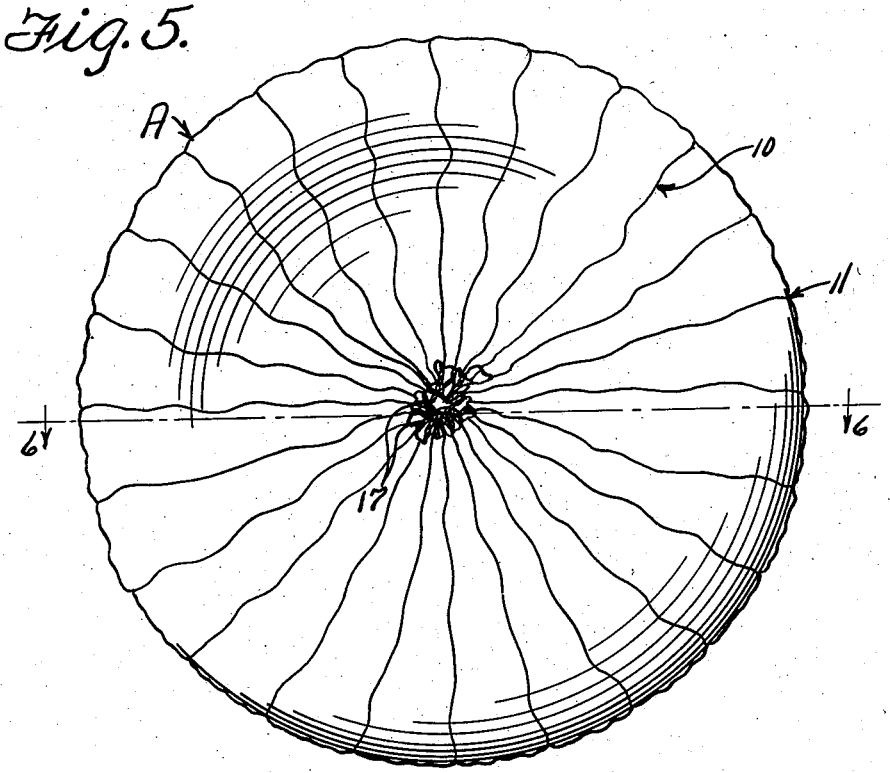
Figure 5 is an inner plan view, partly broken away, of the kite, sail or glider unit of the parachute in its partially collapsed condition.

Referring to the drawings in detail, A designates generally the kite, sail or glider unit, and B the plumb body-harness equipment of the parachute constructed in accordance with the invention, these being hereinafter described in full.

The unit A comprises a body 10 made from weather-proofed flexible material, having a permanently extended central dome or inverted cupshaped area 11, and a foldable or collapsible area 12 concentric thereto, these areas being continuations of one another or unitary with each other, and when such area 11 is extended the unit A in its entirety is of umbrella form.

At the outer facing of the area 11 and outwardly diverging from a common center thereto are reinforcing or spreader bows, ribs or the like 13, which extend from this common center radially for meeting with merger line of demarcation of the areas 11 and 12 with each other, these bows, ribs or the like are rigid in kind and upwardly arched, and are tacked at 14 in any suitable manner to the body 10 at intervals throughout the length of such bows, ribs or the like, giving the permanent dome or inverted cup-shape center formation to such body.

Built within the area 11 is an inflatable bag or balloon 15 which when fully inflated is of concave-convexed formation, consistent with the contour of the said area 11, and is effective for buoyancy to the unit A, the bag or balloon 15 being provided with valved air inflation cocks or nipples 16, one located at the outer side of the area 11 and the other arranged at the inner hollow side of the said bag or balloon. Either of these cocks or nipples 16 can be employed for inflating the said bag or balloon, and helium or other suitable gas may be employed for such purpose. It may also be inflated by the user.

At the perimeter of the area 12 is fixed a plurality of guy-cables 17, which spaced an equal distance from each other, and converge toward and join with a suspension line 18, which at its outer end has fixed thereto a snap fastener 19, for the detachable fastening of the harness B thereto.

The harness B comprises a body embracing strap 20 carrying a conventional buckle fastener 21 for adjustably fitting the harness to a wearer, and joined with such strap 20 at the armpit localities thereof are arm-receiving hanger loops 22 meeting each other where they are attached to a coupling ring 23 for engaging the fastener 19 as a pendant to the line 18. Next to the fastener 19 and formed from the line 18 to project laterally from opposite sides thereof are hand-hold loops 24, these being engaged by the hands when a person wears the harness B for parachuting in the use of the parachute. The device may or may not be provided with the hand-hold loops 24.

The loops 22 at the points of connection thereof with the strap 20 are fitted with armpit pads 25 for comfort at such points to the wearer of the harness. The harness B when worn and parachuting, with the hands of such wearer engaging the loops 24, the weight of the said wearer effects plumb action to the line, and by a pull on either loop 24 by a parachuter, this will assist in holding the latter equally balanced, thereby giving such parachuter a better chance for foot landing on descending. The wearing of the harness B is clearly disclosed in Figure 1 of the drawings.

When the parachute as before described is conditioned for use, the bag or balloon 15 is fully inflated, the area 12 is collapsed and tucked into the dome or inverted cupped area 11, which gives a partially collapsed setting, and the harness B is applied to a wearer, then this harness is attached to the line 18, so that when the parachuter takes off or jumps the parachute will instantly open to its full extent throughout the body 10, it being assumed, of course, that when the parachuter takes off or jumps the loops 24 are grasped by the hands for plumb balance in flight for bettering the chances for foot landing on descent.

In Figure 7 of the drawings there is shown a modification, of the parachute, wherein the area 26 is devoid of a buoyant medium hereinbefore referred to in association with the area 11, and with this exception the said area 26 is constructed identically to the area 11 just mentioned.

The bag or balloon 15 has formed interiorly thereof limit struts 27, these being fastened to opposite walls to set the expansion activity of such bag or balloon, as well as to strengthen the same, and at the same time does not interfere with the deflating thereof.

It will be apparent from the foregoing that the parachute opens automatically.

What is claimed is:

A parachute of the kind described, a sail body of substantially umbrella shape when fully extended and having a central dome formation and a collapsible area concentric thereto, bows radially extended from the center of the dome formation to the collapsible area, a collapsible bag forming a buoyant air tight space therein within the dome having cables connecting the inner wall of the bag with the inner wall of the dome, and a valve arrangement for inflating the space between the dome and the collapsible wall.

THEOFANIS EFSTATHIOU.